H. L. WALBRIDGE.
TIRE.
APPLICATION FILED AUG. 24, 1907.
936,837.
Patented Oct. 12, 1909.
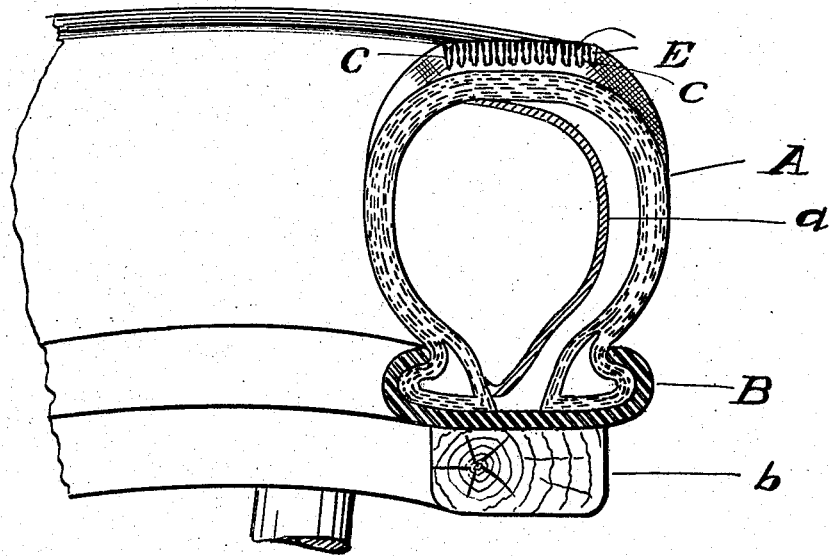
Fig. 1.
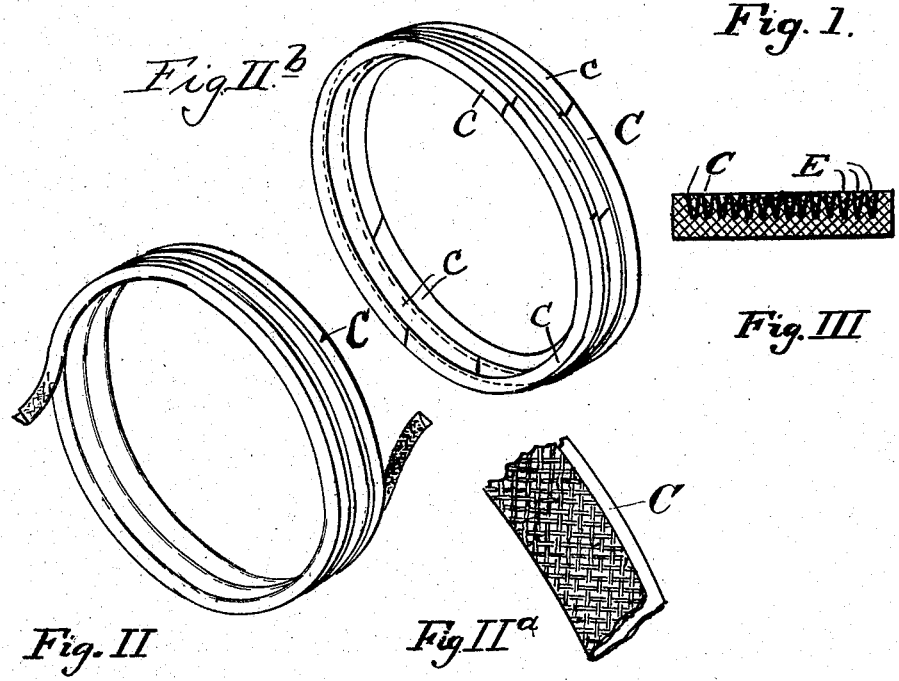
Fig. II.     Fig. II^a.
Fig. III.
WITNESSES:
INVENTOR
Henry Loring Walbridge
BY
ATTORNEY

UNITED STATES PATENT OFFICE.

HENRY L. WALBRIDGE, OF SPRINGFIELD, MASSACHUSETTS, ASSIGNOR TO THE CHANDLER COMPANY, OF SPRINGFIELD, MASSACHUSETTS, A CORPORATION OF MASSACHUSETTS.

TIRE.

936,837.  Specification of Letters Patent.  Patented Oct. 12, 1909.

Application filed August 24, 1907. Serial No. 389,929.

*To all whom it may concern:*

Be it known that I, HENRY LORING WALBRIDGE, a citizen of the United States, a resident of Springfield, in the county of Hampden, State of Massachusetts, have made certain new and useful Improvements in Tires, of which the following is a specification, reference being made to the drawings forming a part hereof.

This invention pertains to tires of wheels for vehicles, and relates to the structure of the tire, and in particular that portion which comes in contact with the road surface.

While the practice of my invention affords many advantages, I will, among others, cite the object of preventing skidding or any undesired slipping of tires, and in addition the object of increased durability of the tire surface in contact with the road, known as the tread.

While numerous attempts have been made to affix to a tire so-called anti-skidding devices of metal, and also to incorporate in the structure of the tire metal members to prevent slipping or skidding, though these attempts have invariably proven ineffective, or, on the other hand if in a measure advantageous for one purpose they have caused injury to the tire or detracted from the particular objects of a tire as cushioning or resiliency, or they have not been durable.

While my invention may be variously practiced, I will describe one embodiment of my invention with reference to the drawings hereto attached, in which—

Figure I is a section in part perspective of a pneumatic tire on a felly; Fig. II illustrates the fabric which I use in the construction of my tire; Fig. II$^a$ is a piece of the fabric on enlarged scale; Fig. II$^b$ shows in perspective a plurality of strips of fabric on an enlarged scale; Fig. III is one manner of constructing a portion which may be used in the building-up of my tire.

In the particular embodiment of my invention, as shown, "A" is a tire shoe; while "a" represents the inner or inflatable tube in the tire; "B" is a metal rim, and "b" a felly of a wheel to which the rim with tire is attached. In the outer portion of the tire are fabric members "C" incorporated with the rubber or similar material of which the outer portion or tread of the tire is constructed.

I utilize fabric as shown in Fig. II$^a$ cut on the bias or fashioned on the bias, and which I preferably fold as indicated in Fig. II$^a$, and which I lay around the tire as illustrated in Fig. II, so that a plurality of strips or a continuous strip of narrow fabric extends around the outer portion of the tire preferably in a number of turns, which fabric substantially presents its edge to the tread. In Fig. II$^a$, I have shown the fabric C of a single piece; while in Fig. II$^b$, I have shown the fabric as composed of a plurality of strips $c$. Between the layers of fabric I leave a substantial space "E", which is filled with rubber or like material and which may be effected by previously coating the fabric with rubber, or, in other words, substantially frictioning the fabric. Between the folds of the fabric I likewise leave space filled with rubber. These interstices between the plurality of layers of fabric are each substantially greater than the thickness of the fabric, whereby I secure a surface largely of rubber with a plurality of fabric edges emerging or protruding therefrom, but substantially flush with the surface of the rubber, preserving the flexibility of the tire.

This construction of fabric and rubber may be embodied as in Fig. I in the tire shoe proper, or the tire itself in the case of a single tube tire, so that it forms a unit. On the other hand I may, as in Fig. III, separately make the tread portion composed of rubber with the fabric set on edge and vulcanized into it, but with substantial rubber partitions between the layers of fabric, and this separately formed tread can then be combined with the tire.

I have found that attempts heretofore to use protruding fabric in place of the rubber in a tire have resulted in the absorption of moisture, with its ruining effect upon the quality of the tire for its proper use. In other fruitless attempts heretofore made, I have found that the packing together into a solid body of fabric cemented together produces a tire with no resiliency whatsoever and subject to rapid wear and deterioration, as compared with my invention.

For the above and various other reasons, I have been led to the discovery that I can overcome objections and produce a most effective tire by my mode of construction, which, in addition to the above description, includes several detailed features. I prefer a fabric such as ramie properly treated, which not having the qualities of a cotton fiber as frequently embodied in fabrics, does not absorb moisture as used in my construction, and this combined with the feature of thorough frictioning of the fabric and with an ample layer of rubber between the layers of fabric, protects the fabric against deterioration, as by rotting. The ample amount of rubber interstices likewise prevents the rapid wear of the protruding threads or particles of the fabric, and while preferring a relatively loose woven fabric, and when as preferred using it on the bias, I effect a very close and lasting union between the adjacent layers of rubber on either side of a fabric layer, particularly near the outer portion of the fabric layers. This it will be seen is owing to the curvature of the fabric spreading the threads slightly more on the outer portion than the inner portion of the strip of fabric.

With the relative amount of rubber and fabric combined in my structure I do not affect the resiliency of the tread of the tire to any objectionable extent, but on the contrary produce a structure which will not be injured by the extreme flexing incident to the compression of a pneumatic tire. Any slight hardening or stiffening of the tread, however, it will be noted is in the portion of the tire superposed upon a yielding back-ground, namely, in the case of a pneumatic tire the pneumatic or inflated portion of the tire, while if my tread is supported upon an ample rubber cushion of a solid tire, the plain rubber between my special tread construction and the felly is of such extent and pliability as to afford in that case, as well as in the pneumatic tire, all the resiliency desired and obtained in the ordinary construction of tire, while added to the general quality that of great durability of the tread and the non-skidding or slipping quality. The backing of yielding material either proper rubber or the pneumatic portion of an inflated tire, or otherwise, insures the resiliency or pliability of a tire, while conversely my construction of tread is such that when so used it is not subject to any deleterious effect by the excessive yielding and remains effective for all its advantageous purposes, irrespective of the yielding of the pneumatic or other base above which it is superposed.

While having described my invention as embodied in one specific form, it will be understood that various modifications and varieties of embodiment are possible, and my invention is not confined to the particular construction shown and described, but

What I claim and desire to secure by Letters Patent is:

1. A tire including in combination, a tread and means for yieldingly supporting said tread, said tread containing a plurality of continuous layers of fabric extending circumferentially about said tire and protruding flush with the road contacting surface, said layers lying substantially normal to the road contacting surface and being separated from each other by a layer of rubber.

2. A tire including in combination, a tread and means for yieldingly supporting said tread, said tread containing continuous strips of fabric extending circumferentially about said tire to form layers lying substantially normal to the road contacting surface and separated from each other by a layer of rubber, said layers protruding flush with the road contacting surface.

3. A tire including in combination, a tread, and means for yieldingly supporting said tread, said tread containing a plurality of continuous layers of fabric united with the rubber and extending circumferentially about said tire and protruding flush with the road contacting surface, each layer being separated from its adjacent layer by a layer of rubber of greater thickness than the layer of fabric, said layers of fabric being substantially normal to the road contacting surface, and the intervening layers of rubber being united with the body of the tire.

4. A tire including in combination, a tread and means for yieldingly supporting said tread, said tread containing strips of fabric folded to form layers extending circumferentially about said tire with the edges of the strip protruding substantially flush with the road contacting surface, said layers being separated from each other at the contacting surface by a layer of rubber united with the tire proper.

5. In a pneumatic tire, a tread and pneumatic means for supporting the tread, said tread portion containing layers of fabric united with the rubber of the tire, an edge of each of said layers protruding substantially flush with the road contacting surface and the edges of the layers being separated from each other by a layer of rubber united with the tire proper whereby a continuous roughened surface of alternate rubber and fabric side by side, is provided.

6. A tire having embedded therein a plurality of continuous flexible strips, the said strips being folded longitudinally and medially with their edges presented upon the tread surface of the tire.

HENRY L. WALBRIDGE.

Witnesses:
Wm. M. Muir,
James A. Hawkins.